United States Patent [19]

Baer

[11] Patent Number: 4,469,019
[45] Date of Patent: Sep. 4, 1984

[54] BARBECUE GRILL

[76] Inventor: Helen W. Baer, 2043 Briarcliffe Dr., Springfield, Ill. 62704

[21] Appl. No.: 487,161

[22] Filed: Apr. 21, 1983

[51] Int. Cl.³ .......................................... A47J 37/04
[52] U.S. Cl. ...................................... 99/339; 99/340; 99/393; 99/421 HV; 126/25 AA; 126/41 A; 126/41 B
[58] Field of Search .......... 99/339, 340, 393, 421 HV, 99/443 R; 126/41 A–41 B, 25 AA, 338

[56] References Cited

U.S. PATENT DOCUMENTS

| | | | |
|---|---|---|---|
| 2,819,667 | 1/1958 | Victor | 99/421 H |
| 3,033,189 | 5/1962 | Clark | 126/25 |
| 3,085,497 | 4/1963 | Statia, Sr. | 99/340 |
| 3,134,320 | 6/1964 | Meyer | 99/340 |
| 3,257,937 | 6/1966 | Mell | 99/421 HV |
| 3,298,301 | 1/1967 | Lowndes | 99/340 |

Primary Examiner—Billy J. Wilhite
Assistant Examiner—Christine A. Peterson
Attorney, Agent, or Firm—Senniger, Powers, Leavitt and Roedel

[57] ABSTRACT

A barbecue grill comprising a fire bowl, legs for supporting the fire bowl, a cooking grill above the fire bowl rotatable about a generally vertical axis, and a rod which is selectively mountable in a generally horizontal position above the cooking grill for use as a spit and in a generally vertical position for use in rotating the cooking grill. A single motor is used to turn the rod, the motor being selectively mountable in two different locations on the barbecue grill depending on whether the rod is being used as a spit or to rotate the cooking grill.

16 Claims, 9 Drawing Figures

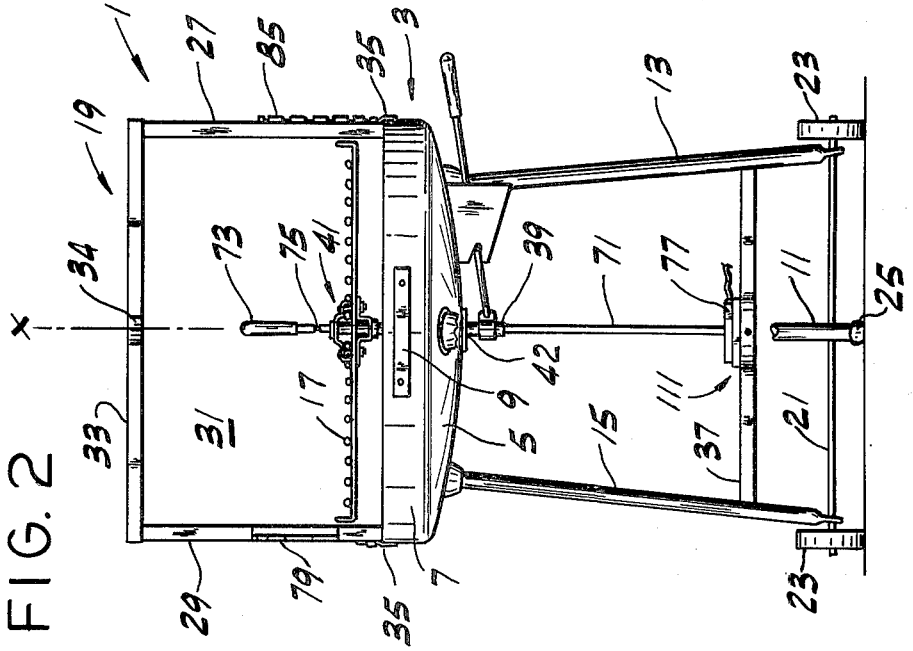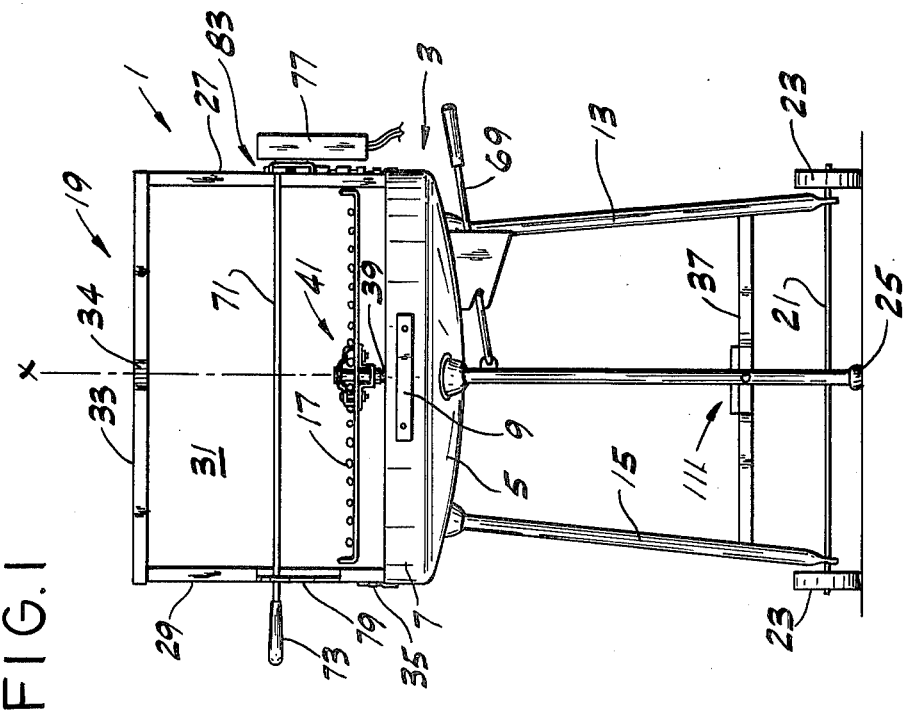

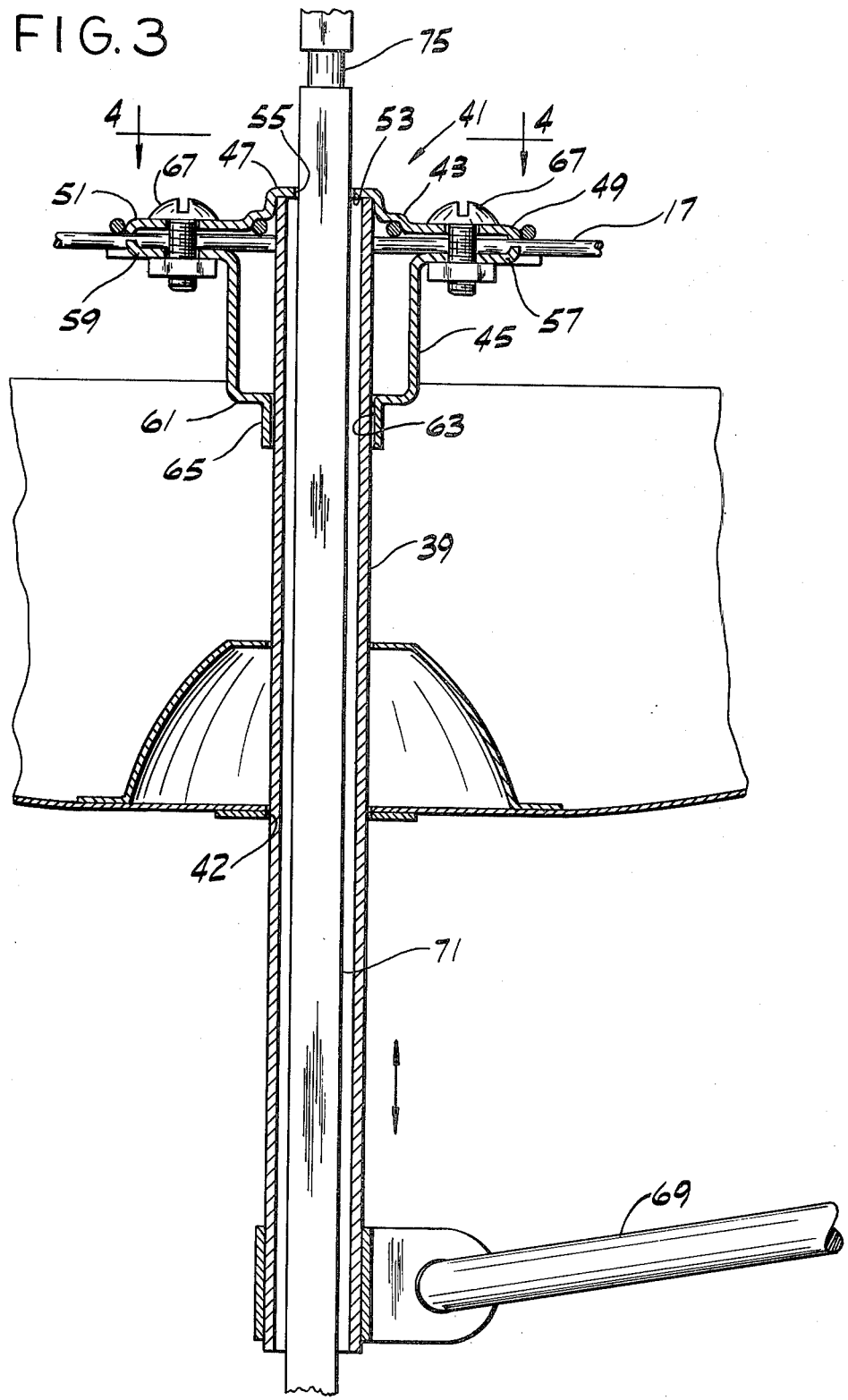

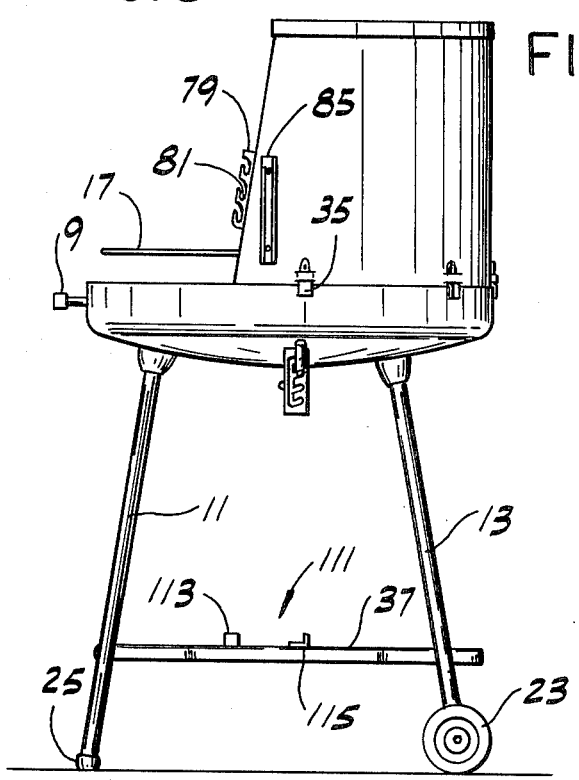
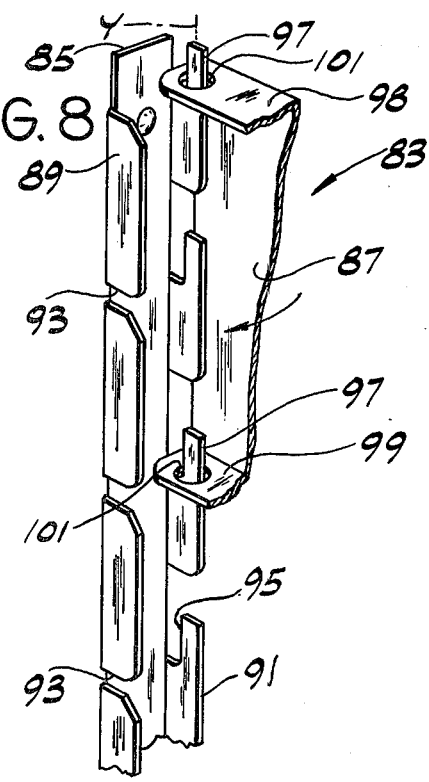
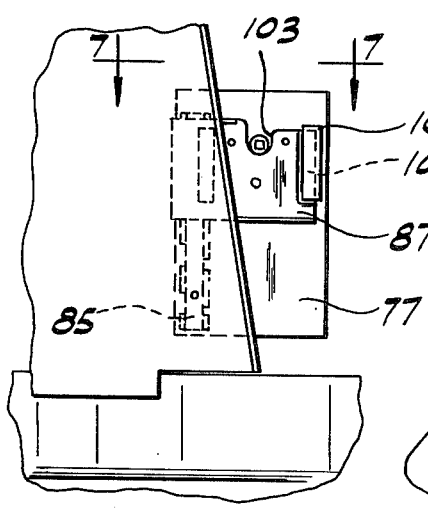
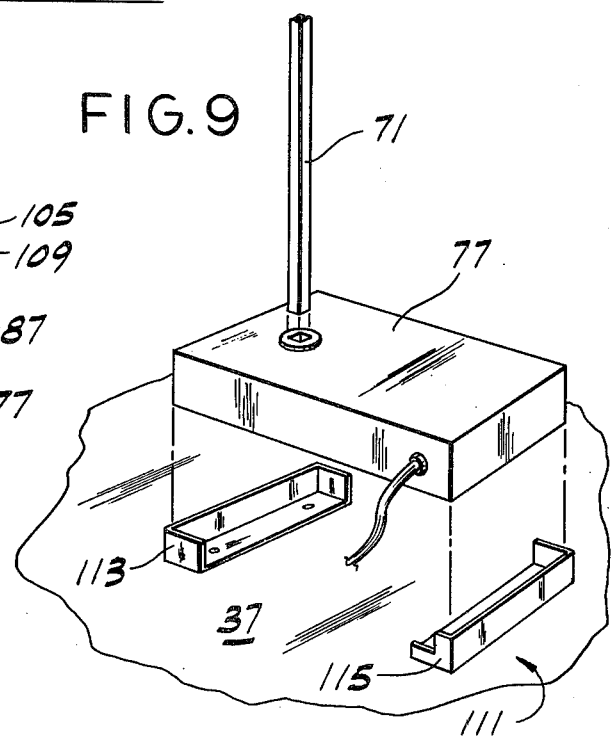

BARBECUE GRILL

BACKGROUND OF THE INVENTION

This invention relates generally to cooking appliances and more particularly to an outdoor barbecue grill of the type having both a spit and a rotary cooking grill.

A barbecue grill spit is typically turned by a motor at a uniform rate to promote uniform cooking of food on the spit. The rotary cooking grill, on the other hand, must usually be turned by hand. As a result, it is not turned as much as it should be during the cooking process to ensure uniform cooking. It will be noted in this connection that different parts of a barbecue fire burn at different temperatures (due, for example, to uneven burning of the fuel itself and to the intermittent drip of fat into various parts of the fire). Thus it is advantageous to turn the cooking grill frequently, and preferably constantly, to obtain a more uniform heating of the food on the grill. However, to do this by hand is so inconvenient as to be virtually impractical.

Efforts have been made to overcome this problem by providing a motor drive for the rotary grill. In this regard, U.S. Pat. Nos. 3,298,301, 3,134,320 and 3,033,189 show several barbecue grills where the motor used to turn the spit is also used to rotate the cooking grill. However, in each case the drive mechanism used to rotate the cooking grill is relatively complex and requires numerous special parts, thus adding to the cost of the product and increasing its susceptibility to breakdown.

SUMMARY OF THE INVENTION

Among the several objects of this invention may be noted the provision of an improved barbecue grill of the type having both a spit and a rotary cooking grill; the provision of such a grill having a motor drive which may be used selectively to turn either the spit or the cooking grill so that food on the spit or grill is constantly rotated over the coals to promote uniform cooking; the provision of such a grill wherein the spit is used as part of the drive mechanism to turn the cooking grill, thereby reducing the number of parts which would otherwise be needed; the provision of such a grill which is safe and easy to use; and the provision of such a grill which is relatively inexpensive to manufacture.

Generally, a barbecue grill of the present invention comprises a fire bowl for holding charcoal and the like, legs for supporting the fire bowl above the ground, a cooking grill above the fire bowl rotatable about a generally vertical axis, a rod selectively mountable in a generally horizontal position above the cooking grill for use as a spit and in a generally vertical position for use in rotating the cooking grill on its vertical axis, and a motor for turning the rod on its longitudinal axis. A first motor mount removably mounts the motor in a position in which it is adapted to turn the rod when the latter is in its horizontal position, and a second motor mount removably mounts the motor in a position in which it is adapted to turn the rod when the latter is in its vertical position. Means is also provided for interconnecting the rod and cooking grill when the rod is in its vertical position whereby operation of the motor to turn the rod effects conjoint rotation of the cooking grill.

Other objects and features will be in part apparent and in part pointed out hereinafter.

BRIEF DESCRIPTION OF THE DRAWINGS

FIG. 1 is a front elevation of a barbecue grill of the present invention having a rod shown mounted in horizontal position for use as a spit, and a motor mounted on the hood for turning the rod;

FIG. 2 is a view similar to FIG. 1 with the front leg broken away to show the motor mounted below the fire bowl and the rod mounted in a vertical position for use in rotating the cooking grill;

FIG. 3 is an enlarged vertical section showing the rod in its vertical position extending through a post and mounting bracket;

FIG. 5 is a side view of FIG. 1 with the motor removed;

FIG. 6 is a view of a first motor mount mounting the motor on the hood;

FIG. 8 is a view illustrating how the first motor mount is mounted on the hood; and FIG. 9 is an exploded view of a second motor mount mounting the motor below the fire bowl.

Corresponding reference characters indicate corresponding parts throughout the several views of the drawings.

DESCRIPTION OF THE PREFERRED EMBODIMENT

Figure 4:
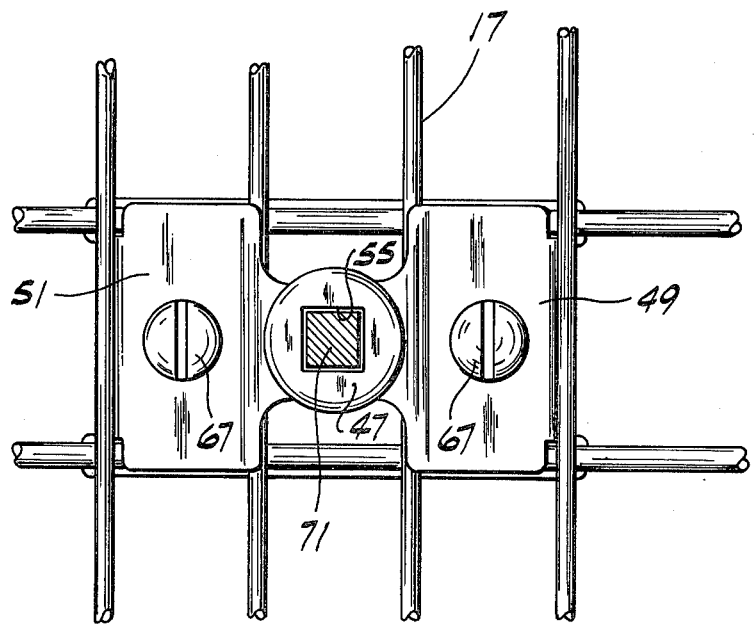
FIG. 4 is an enlarged horizontal section on line 4—4 of FIG. 3.

Referring to the drawings, a barbecue grill of this invention, designated in its entirety by the reference numeral 1, is generally similar in overall appearance to widely used barbecue stands available on the market. Like such stands, the barbecue grill comprises a fire bowl 3 for holding charcoal and the like having a circular relatively shallow bottom 5, an upstanding circular side wall 7 and a handle 9 on the side wall. It also has legs 11, 13, 15 for supporting the bowl 3 above the ground, a round rotary cooking grill 17 above the bowl 3 and a hood 19 secured to the side wall 7 of the bowl and partially enclosing the fire bowl. The legs 11, 13, 15 are suitably secured at their upper ends to the bottom 5 of the bowl. The rear legs 13 and 15 are connected at their lower ends to an axle 21 which carries a pair of wheels 23. The lower end of the front leg 11 has a pedestal support 25 thereon. The hood, as shown in FIGS. 1, 2 and 5, is semi-circular in shape with side portions 27 and 29, a back portion 31 and a top portion 33, and is secured to the upper edge of the side wall 7 of the fire bowl by clips 35. The top portion 33 of the hood has an opening therein in the form of a central notch 34 extending rearwardly from the front edge of the top portion 33. A shelf 37 is fastened between the legs 11, 13, 15 in a generally horizontal position below the fire bowl 3.

Cooking grill 17 is shown as being of the gridiron type and is rotatable about a generally vertical axis X on a vertical post 39 extending up through an opening 42 in the bottom of the fire bowl. The post 39 is preferably of circular-section tubular bar stock. The cooking grill 17 is rotatably mounted on the post 39 by means of a bracket 41 having upper and lower portions 43 and 45, respectively, the former being located above the cooking grill and the latter below it (see FIGS. 3 and 4). The upper portion 43 has a circular center section 47 and two generally rectangular side sections 49, 51, the latter of which are wide enough to span adjacent parallel bars of the cooking grill. The center section 47 is upwardly offset from the side sections to form a circular recess 53 sized for rotatably receiving the upper end of the tubular post 39. For reasons which will appear, the center section 47 has a central rectangular opening 55 therein. The lower portion 45 of the bracket, as shown in FIG. 3, is generally U-shaped and has horizontal flanges 57 and 59 which are approximately of the same size and shape as sections 49 and 51 of the upper bracket portion 43. The base 61 of the lower portion 45 of the bracket has a circular opening 63 therein for receiving the post 39 therethrough. A flange 65 extends downwardly at the circumference of this opening 63 and has a close bearing fit with the post 39. The upper and lower bracket portions 43, 45 are secured together with the cooking grill 17 therebetween, by two nut and bolt fasteners 67. The bolts of the fasteners extend through holes in the side sections 49, 51 of the upper bracket portion 43 down through holes in the flanges 57, 59 of the lower bracket portion 45. With these fasteners 67 tight, the upper and lower bracket portions 43, 45 clamp against the cooking grill 17 and hold it in fixed vertical position with respect to the post 39. The lower end of post 39 is suitable secured (e.g., welded) to a lever 69 which may be used to raise or lower the post to adjust the height of the cooking grill 17 above the fire bowl 3.

Indicated at 71 is a rod which, in the position shown in FIG. 1, extends horizontally above the cooking grill 17 for use as a spit. The rod 71, which has a length greater than the diameter of the cooking grill, is generally rectangular in cross section and has a handle 73 on one end thereof. The rod has a circular groove therein indicated at 75. It is rotated about is longitudinal axis by a motor designated 77. The left end of the rod (as viewed in FIG. 1.) is supported by a bracket 79 which is secured to the left side 29 of the hood 19 and which has a plurality of notches 81 in it for receiving the rod 71 and holding it at different elevations. The circular groove 75 ensures that the rod turns smoothly in the bracket. The right end of the rod is drivably connected to the motor 77 which is supported on the right side 27 of the hood 19 by a first motor mount generally designated 83. This mount comprises a first channel-shaped part 85 secured (e.g., riveted) in vertical position on the right side 27 of the hood at a fixed elevation with respect to the fire bowl 3, and a second part in the form of a vertically-oriented generally rectangular mounting plate 87 which holds the motor 77, the plate being releasably interengageable with the channel-shaped part 85 in a manner to be described hereinafter for holding the motor 77 in a plurality of different positions corresponding to the above stated different rod elevations.

More specifically, the channel-shaped part 85 has a pair of generally parallel flanges projecting outwardly from the side of the hood, the flange toward the front of the grill being designated 89 and the flange toward the back of the grill being designated 91. Both flanges have vertically spaced notches therein, although of different shape. The notches in the front flange 89, indicated at 93, are generally straight and horizontal while the notches in the rear flange 91, indicated at 95, are generally L-shaped forming a plurality of generally upwardly pointing fingers 97 spaced at vertical intervals along the flange 91. As seen in FIG. 8, the bottom edges of corresponding notches in the two flanges 89, 91 are in the same horizontal plane.

The rectangular mounting plate 87 which holds the motor 77 has a pair of generally parallel horizontal flanges 98, 99 along its upper and lower edges. These flanges have two vertically aligned openings 101 therein for receiving a selected pair of fingers 97 on the rear flange 91 of the channel-shaped part 85 of the motor mount, the arrangement being such that the mounting plate 87 and motor 77 thereon are swingable on the fingers 97 relative to the hood 19 about a vertical axis Y. The elevation at which the plate and motor are mounted may be adjusted according to the desired rod elevation by selecting the appropriate pair of fingers 97 on which to mount the plate 87. When the plate 87 and motor 77 are swung from the position shown in FIG. 8 to the position shown in FIG. 6, the outer upper and lower edges of the flanges 98, 99 on the plate extend into two of the notches 93 in the front flange 89 of the channel-shaped part and bear on the bottom edges thereof. With the mounting plate in the position shown in FIG. 6, the rod 71 extends through a U-shaped notch 103 in the upper edge of the plate and into the motor.

Figure 7:
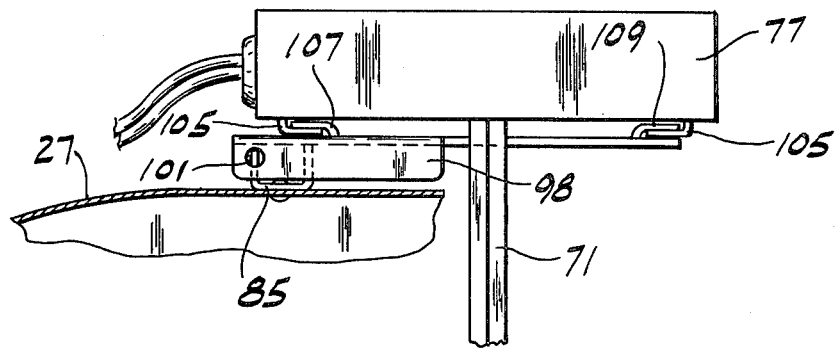
FIG. 7 is an enlarged horizontal section on line 7—7 of FIG. 6.

As shown in FIG. 7, the housing of the motor 77 has two vertical flanges 105 thereon which are slidably interengageable with a complementary flange 107 and a vertical edge margin 109 of the mounting plate 87. Thus the motor 77 may be slidably removed from the mounting plate 87 when desired.

In accordance with this invention, the rod 71 and motor 77 can be used in the manner shown in FIGS. 2, 3, 4 and 9 to rotate the cooking grill 17 on its vertical axis X. To accomplish this, the motor 77 is removed from the mounting plate 87 at the side of the hood and placed in a second motor mount 111 on the shelf 37 below the fire bowl 3. As shown in FIG. 9, this mount 111 is a framework comprising a pair of opposing end frames 113, 115 fastened (as by riveting) to the shelf 37 for holding opposite ends of the motor 77. With the motor 77 in mount 111, the rod 71 may be inserted down through the notch 34 in the top of the hood, through the rectangular opening 55 in the upper portion 43 of bracket 41 and through the tubular post 39 for insertion into the motor (see FIGS. 3 and 9). The longitudinal axis of the rod, when it is in its vertical position, is generally coincident with the axis of rotation of the grill. The rectangular opening 55 in the upper portion 43 of the bracket corresponds in size and shape to that of the rod 71 and the fit of the rod therein is sufficiently close to prevent relative rotation between the rod and the bracket. Thus the rod 71 and cooking grill 17 are interconnected by the bracket 41 (which thus constitutes interconnecting means) whereby operation of the motor to turn the rod effects conjoint rotating of the cooking grill 17. The rotation of the cooking grill over the coals at a constant speed allows the food on the grill to be cooked at a uniform rate.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A barbecue grill comprising a fire bowl for holding charcoal and the like, legs for supporting the fire bowl above the ground, a cooking grill above the fire bowl rotatable about a generally vertical axis, a single rod having a length greater than the diameter of the cooking grill selectively mountable in a generally horizontal position for use as a spit and in a generally vertical position for use in rotating the cooking grill on said vertical axis, a motor for turning the rod on its longitudinal axis, a first motor mount for removably mounting the motor in a position in which it is adapted to turn the rod when the latter is in its horizontal position, a second motor mount for removably mounting the motor in a position in which it is adapted to turn the rod when the latter is in its vertical position, and means for interconnecting the rod and cooking grill when the rod is in its vertical position whereby operation of the motor to turn the rod effects conjoint rotation of the cooking grill.

2. A barbecue grill as set forth in claim 1 wherein said second motor mount is located below the fire bowl, said rod, when in its vertical position, being adapted to extend through the bottom of the fire bowl.

3. A barbecue grill as set forth in claim 2 wherein the longitudinal axis of the rod, when the rod is in its vertical position, is generally coincident with the axis of rotation of the grill.

4. A barbecue grill as set forth in claim 3 wherein said cooking grill is rotatable on a vertical post extending up from the bottom of the fire bowl, said rod, when in its vertical position, being adapted to extend through said post.

5. A barbecue grill as set forth in claim 4 wherein said rod is noncircular in cross section, said interconnecting means being attached to the cooking grill and having a first opening therein corresponding in size and shape to that of said rod for receiving the rod therethrough, the fit of said rod portion in the first opening being sufficiently close to prevent relative rotation between the rod and said interconnecting means.

6. A barbecue grill as set forth in claim 5 wherein said interconnecting means comprises a bracket adapted to be fastened to the grill, said bracket having said opening therein.

7. A barbecue grill as set forth in claim 6 wherein said bracket has a second opening therein for receiving said post.

8. A barbecue grill as set forth in claim 1 further comprising means for supporting the rod in horizontal position above the fire bowl at a plurality of different elevations, said first motor mount being adapted for holding said motor in a plurality of different positions corresponding to the different elevations of the rod.

9. A barbecue grill as set forth in claim 8 wherein said first motor mount comprises a first part secured at a fixed elevation with respect to said fire bowl and a second part for holding the motor, said second part being releasably interengageable with the first part for holding the motor at said plurality of different positions corresponding to said different elevations of the rod.

10. A barbecue grill as set forth in claim 9 further comprising a hood at least partially enclosing the fire bowl, said support means being secured to one side of the hood and said first part of said first motor mount being secured to the opposite side of the hood.

11. A barbecue grill as set forth in claim 10 wherein said support means comprises a bracket fastened to said one side of the hood having a plurality of notches therein for holding said rod at said different elevations.

12. A barbecue grill as set forth in claim 1 further comprising a shelf fastened to the legs in horizontal position below the fire bowl, said second motor mount being secured atop the shelf for mounting the motor thereon, said rod, when in its vertical position, being adapted to extend upwardly from the motor through the bottom of the fire bowl.

13. A barbecue grill as set forth in claim 12 wherein said second motor mount comprises a framework fastened to the shelf for holding said motor therein.

14. A barbecue grill as set forth in claim 13 wherein said framework comprises a pair of opposing end frames for holding opposite ends of the motor.

15. A barbecue grill as set forth in claim 12 wherein said shelf is disposed toward the lower ends of said legs.

16. A barbecue grill as set forth in claim 1 further comprising a hood at least partially enclosing the fire bowl, said hood having an opening therein for facilitating mounting of said rod in said vertical position.

* * * * *